United States Patent [19]

Bellasio

[11] 3,883,531

[45] May 13, 1975

[54] PERHYDROPHTHALAZIN-1(2H)-ONE AND PROCESS

[75] Inventor: Elvio Bellasio, Albate-Como, Italy

[73] Assignee: Gruppo Lepetit S.p.A., Milano, Italy

[22] Filed: Apr. 6, 1973

[21] Appl. No.: 348,831

[30] Foreign Application Priority Data
Apr. 17, 1972 Italy.................................. 49700/72

[52] U.S. Cl............... 260/250 P; 424/250; 260/690
[51] Int. Cl............................................ C07d 51/06
[58] Field of Search.................................. 260/250 P

[56] References Cited
UNITED STATES PATENTS
3,644,361  2/1972  Bellasio.......................... 260/250 P

OTHER PUBLICATIONS

Andreev, et al. Chemical Abstract 66:54756g.
Castle, ed, Condensed Pyridazines Including Cinnolines and Phthalazines, Wiley, N.Y., 1973 pp. 725 and 739.
Elder, Diss. Abstr. Int. B 1970, 30(9), 4040.

Primary Examiner—Alton D. Rollins
Assistant Examiner—Ralph D. McCloud
Attorney, Agent, or Firm—Maynard R. Johnson

[57] ABSTRACT

Hydrogenated phthalazin-1(2H)-one compounds such as 5,6,7,8-tetrahydrophthalazin-1(2H)-one are prepared by catalytic hydrogenation of phthalazin-1(2H)-one. The compounds are useful as bronchodilator agents.

4 Claims, No Drawings

PERHYDROPHTHALAZIN-1(2H)-ONE AND PROCESS

BRIEF SUMMARY OF THE INVENTION

This invention is directed to a new class of pharmacologically active compounds and to a method for their preparation. More particularly, the compounds which form the subject of this invention are hydrogenated phthalazin-1(2H)-one derivatives corresponding to one of the general formulae:

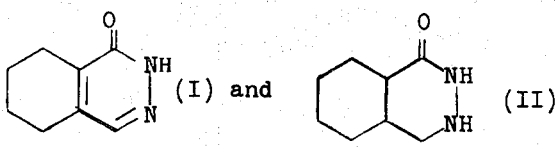

The compound of formula I above is named as 5,6,7,8-tetrahydrophthalazin-1(2H)-one, and the compound of formula II is named as perhydrophthalazine-1(2H)-one.

DESCRIPTION OF PREFERRED EMBODIMENTS

The compounds of this invention are prepared by the catalytic hydrogenation of phthalazin-1(2H)-one (phthalazone) of the formula:

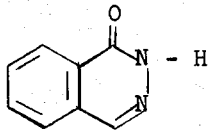

According to a preferred embodiment of the invention, Adams platinum (platinic oxide, $PtO_2$) in the presence of acetic acid is used as the catalyst and the hydrogenation reaction is carried out in a range of temperature varying from about 50°C. to about 70°C., under a pressure varying from about 65 to about 75 atmospheres. The hydrogenation reaction is generally completed within about two hours. The reaction mixture is then worked up following the usual procedures in organic chemistry.

In a preferred procedure, the reaction mixture is chromatographed through a silica gel column to separate the organic compounds. As the eluents, ethyl acetate followed by lower alkanols, e.g. lower alkanols of one to three carbon atoms, can be advantageously employed. When ethyl acetate is used as the eluent, the tetrahydro product of formula I is recovered in the ethyl acetate eluate. When the chromatographic separation is continued employing a lower alkanol as the eluent, the perhydro product corresponding to formula II is recovered in the lower alkanol eluate.

The first ethyl acetate fractions also contain a small amount of unreacted starting material, which can be separated by conventional purification techniques. It has been found that, when a large excess of acetic acid is employed during the hydrogenation step, e.g. about 5 parts by weight of acetic acid per part by weight of phthalazone, the yields of products I and II are highly improved and a very small amount of unreacted phthalazone is present at the end of the process.

Both products are solid, crystalline, insoluble in water, slightly soluble in lower alkanols, and very soluble in acidic media.

The compounds of the present invention are active as bronchodilator agents. This pharmacological activity is coupled with a very low toxicity. The $LD_{50}$ values for both compounds are higher than 500 mg/kg.

In using the compounds as bronchodilators, they are administered to animals by conventional routes of administration, for instance parenteral and oral routes, in amounts sufficient to provide effective bronchodilation.

The following example describes in detail the compounds of the invention and illustrates the method for their preparation.

EXAMPLE a. 5,6,7,8-Tetrahydrophthalazin-1(2H)-One

A mixture of 100 grams of phthalazin-1(2H)-one (phthalazone), 500 milliliters of acetic acid and 10 grams of $PtO_2$ is hydrogenated in a Parr bomb at 60°C. and 70 atmospheres. After 2 hours the bomb is cooled, the solution filtered and the solvent evaporated. The resulting solid is dissolved in 200 milliliters of ethyl acetate and the solution is chromatographed through 2900 grams of silica gel in a 10 × 100 centimeter glass column. The column is eluted with ethyl acetate, 1000 milliliter eluate fractions are collected and evaporated in vacuo. The residue is examined by thin layer chromatography (T.L.C.) and infrared spectrography (I.R.). From the first fractions, 13 grams of unreacted phthalazin-1(2H)-one are recovered, followed by 25 grams of crude 5,6,7,8-tetrahydrophthalazin-1(2H)-one, which is purified by crystallization from isopropyl ether. 16 Grams of the purified product, melting at 141°–143°C., are obtained. The structure of the product is confirmed by ultraviolet absorption, infrared spectrography and elemental analysis: λ max (pH 7.4) = 273 mµ, $E_{1cm}^{1\%}$ = 265; λ max (NaOH 0.1N) — 287 mµ, $E_{1cm}^{1\%}$ = 250. Most significant I.R. bands (in $cm^{-1}$): 3150, 1650, 1630, 1560. Elemental analysis for $C_8H_{10}N_2O$ gives: percent calculated C, 63.98, H, 6.71 and N, 18.65, and percent found C, 63.55, H, 6.91 and N, 18.32.

b. Perhydrophthalazine-1(2H)-One

When no further material is obtained from the column by elution with ethyl acetate, the column is eluted with methanol, and 45 grams of crude perhydrophthalazin-1(2H)-one are obtained. The product is dissolved in 2000 milliliters of boiling isopropyl ether and the solution is concentrated to 1000 milliliters under ambient pressure. Yield 25 grams; melting at 162°–164°C. The structure of the product is confirmed by analysis.

Most significant I.R. bands (in $cm^{-1}$): 3160, 1650. Elemental analysis for $C_8H_{14}N_2O$ gives: percent calculated C, 62.30, H, 9.15 and N, 18.47, and percent found C, 62.72, H, 8.30 and N, 17.81.

The bronchodilator activity of the new compounds was tested according to the procedure described by Konzett-Rossler in Arch. f. exp. Path. u. Pharmakol. 195, 71–74, 1940. The compounds to be tested are administered to guinea pigs intravenously at a dose of 10 milligrams per kilogram 2 minutes before administration of an agonist substance, i.e. a substance which provokes a bronchoconstriction.

Histamine is employed as the agonist substance. The bronchodilator activity of the new compounds is expressed in terms of average percent blockade of the activity of the histamine agonist substance. In these operations 5,6,7,8-tetrahydrophthalazin-1(2H)-one produces a 48 percent blockade of histamine and perhydrophthalazin-1(2H)-one produces a 28 percent blockade, both at dosages of 10 milligrams per kilogram, i.v. In other operations, both compounds are found to have oral $LD_{50}$'s greater than 500 milligrams per kilogram in mice.

What is claimed is:

1. Perhydrophthalazin-1(2H)-one.
2. A process for preparing a phthalazin-1(2H)-one compound, selected from 5,6,7,8-tetrahydrophthalazin-1(2H)-one and perhydrophthalazin-1(2H)-one, comprising the step of hydrogenating phthalazin-1(2H)-one in the presence of platinic oxide and excess acetic acid.
3. The process of claim 2 wherein the hydrogenation is carried out at a temperature of from 50°C. to 70°C. under a hydrogen pressure of from 65 to 75 atmospheres.
4. The process of claim 2 in which the excess acetic acid is employed in an amount of at least about 5 parts by weight of acetic acid per part by weight of phthalazin-1(2H)-one.

* * * * *